(12) United States Patent
Jung et al.

(10) Patent No.: US 12,254,877 B2
(45) Date of Patent: Mar. 18, 2025

(54) DISPLAY DEVICE

(71) Applicant: LG ELECTRONICS INC., Seoul (KR)

(72) Inventors: Eunkyung Jung, Seoul (KR); Hyosung Kim, Seoul (KR); Taejin Park, Seoul (KR); Woojin Choi, Seoul (KR); Sunho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 471 days.

(21) Appl. No.: 17/298,319

(22) PCT Filed: Dec. 11, 2018

(86) PCT No.: PCT/KR2018/015684
§ 371 (c)(1),
(2) Date: May 28, 2021

(87) PCT Pub. No.: WO2020/122271
PCT Pub. Date: Jun. 18, 2020

(65) Prior Publication Data
US 2022/0028380 A1    Jan. 27, 2022

(51) Int. Cl.
*G10L 15/22*   (2006.01)
*G10L 15/02*   (2006.01)
*H04N 21/422*  (2011.01)

(52) U.S. Cl.
CPC ............. *G10L 15/22* (2013.01); *G10L 15/02* (2013.01); *G10L 2015/025* (2013.01); *G10L 2015/223* (2013.01); *H04N 21/422* (2013.01)

(58) Field of Classification Search
CPC ... G10L 15/22; G10L 15/02; G10L 2015/025; G10L 2015/223; G10L 15/28; G10L 15/187; G10L 2015/088; G10L 15/08; H04N 21/422; H04N 21/42203; H04N 21/4432; G06F 3/167
See application file for complete search history.

(56) References Cited

U.S. PATENT DOCUMENTS 9,720,644 B2 * 8/2017 Ohmura .................. G10L 15/26
10,074,364 B1 * 9/2018 Wightman .............. G10L 15/26
(Continued)

FOREIGN PATENT DOCUMENTS

EP         3157005 A1    4/2017
KR    10-2014-0022320 A   2/2014
(Continued)

*Primary Examiner* — Michael Colucci
(74) *Attorney, Agent, or Firm* — Birch, Stewart, Kolasch & Birch, LLP

(57) ABSTRACT

According to an embodiment of the present disclosure, a display device includes a microphone, a wake-up word recognition unit configured to determine whether a voice wake-up word received through the microphone is recognized, and a main processor configured to, when recognition of the voice wake-up word is successful in the wake-up word recognition unit, determine whether the voice wake-up word is a normal wake-up word based on feature information of the voice wake-up word, and, when it is determined that the voice wake-up word is the normal wake-up word, perform a function corresponding to a received speech command as the speech command is received through the microphone.

8 Claims, 8 Drawing Sheets

(56) References Cited

U.S. PATENT DOCUMENTS

| | | | | |
|---|---|---|---|---|
| 10,332,513 | B1* | 6/2019 | D'Souza | G10L 15/22 |
| 2011/0313613 | A1* | 12/2011 | Kawahara | B60L 50/61 |
| | | | | 320/134 |
| 2014/0111420 | A1 | 4/2014 | Ahn et al. | |
| 2015/0161990 | A1 | 6/2015 | Sharifi | |
| 2015/0302856 | A1 | 10/2015 | Kim et al. | |
| 2016/0057261 | A1 | 2/2016 | Bang | |
| 2017/0025124 | A1* | 1/2017 | Mixter | G10L 15/32 |
| 2018/0277112 | A1 | 9/2018 | Kim et al. | |
| 2019/0096390 | A1* | 3/2019 | Kurata | G10L 15/063 |
| 2019/0259382 | A1* | 8/2019 | Stogner | G10L 15/18 |
| 2020/0184958 | A1* | 6/2020 | Norouzi | G09B 19/04 |
| 2022/0044670 | A1* | 2/2022 | Shim | H04R 1/1041 |

FOREIGN PATENT DOCUMENTS

| | | |
|---|---|---|
| KR | 10-2014-0050484 A | 4/2014 |
| KR | 10-1614756 B1 | 4/2016 |
| KR | 10-2018-0107637 A | 10/2018 |
| KR | 10-2018-0127065 A | 11/2018 |

\* cited by examiner

DISPLAY DEVICE

CROSS REFERENCE TO RELATED APPLICATIONS

This application is the National Phase of PCT/KR2018/015684 filed on Dec. 11, 2018, which is hereby expressly incorporated by reference into the present application.

TECHNICAL FIELD

The present disclosure relates to a display device, and more specifically, to a display device capable of performing speech recognition.

BACKGROUND ART

Digital TV services using wired or wireless communication networks are becoming more common. The digital TV services can provide a variety of services that could not be provided by conventional analog broadcasting services.

For example, IPTV (Internet Protocol Television) and smart TV services, which are types of digital TV services, provide interactive interfaces that enable users to actively select a type of a viewing program and a viewing time. IPTV and smart TV services may provide various additional services, such as Internet search, home shopping, and online games, based on the interactive interface.

In addition, recently, a speech recognition service for recognizing a user's speech through a TV and performing a function corresponding to the recognized speech has been provided.

Therefore, speech recognition through a TV intuitively causes user discomfort than other products when false recognition occurs due to environmental noise or conversations of other people while using the TV.

Since speech misrecognition may lead to unwanted operations such as TV On/Off, reservation function, and channel switching, a method to verify the misrecognition is necessary.

DISCLOSURE

Technical Problem

An object of the present disclosure is to prevent speech from being misrecognized, contrary to a user's intention, when providing a remote speech recognition service through a TV.

Technical Solution

A display device according to an embodiment of the present disclosure may perform verification for recognition of a voice wake-up word by dividing a process of recognizing the voice wake-up word into two steps.

The display device according to an embodiment of the present disclosure verifies a voice wake-up word by determining whether the voice wake-up word falls within a range of a normal wake-up word using feature information of the voice wake-up word when the recognition of the voice wake-up word is successful.

Advantageous Effects

According to various embodiments of the present disclosure, a similar spoken word is distinguished by a method of verifying a voice wake-up word, so that a user can have confidence in the operation of a TV according to the wake-up word.

In addition, it is possible to prevent unwanted TV operations from being performed by discriminating frequently occurring noise that can be recognized as a wake-up word, thereby eliminating user discomfort.

MODE FOR INVENTION

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
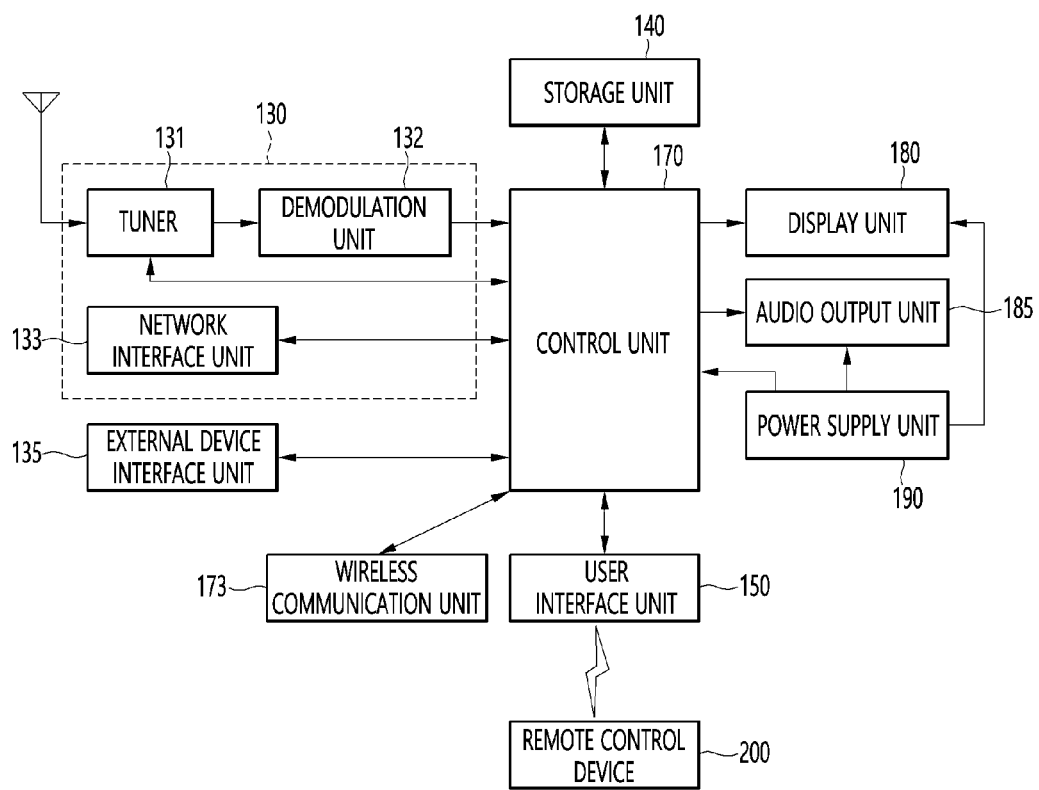
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit 170, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A sound signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. That is, the network interface unit 133 can transmit or receive data to or from a corresponding server by accessing a predetermined webpage through the network.

Then, the network interface unit 133 can receive contents or data provided from a content provider or a network operator. That is, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not shown) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

Moreover, the wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
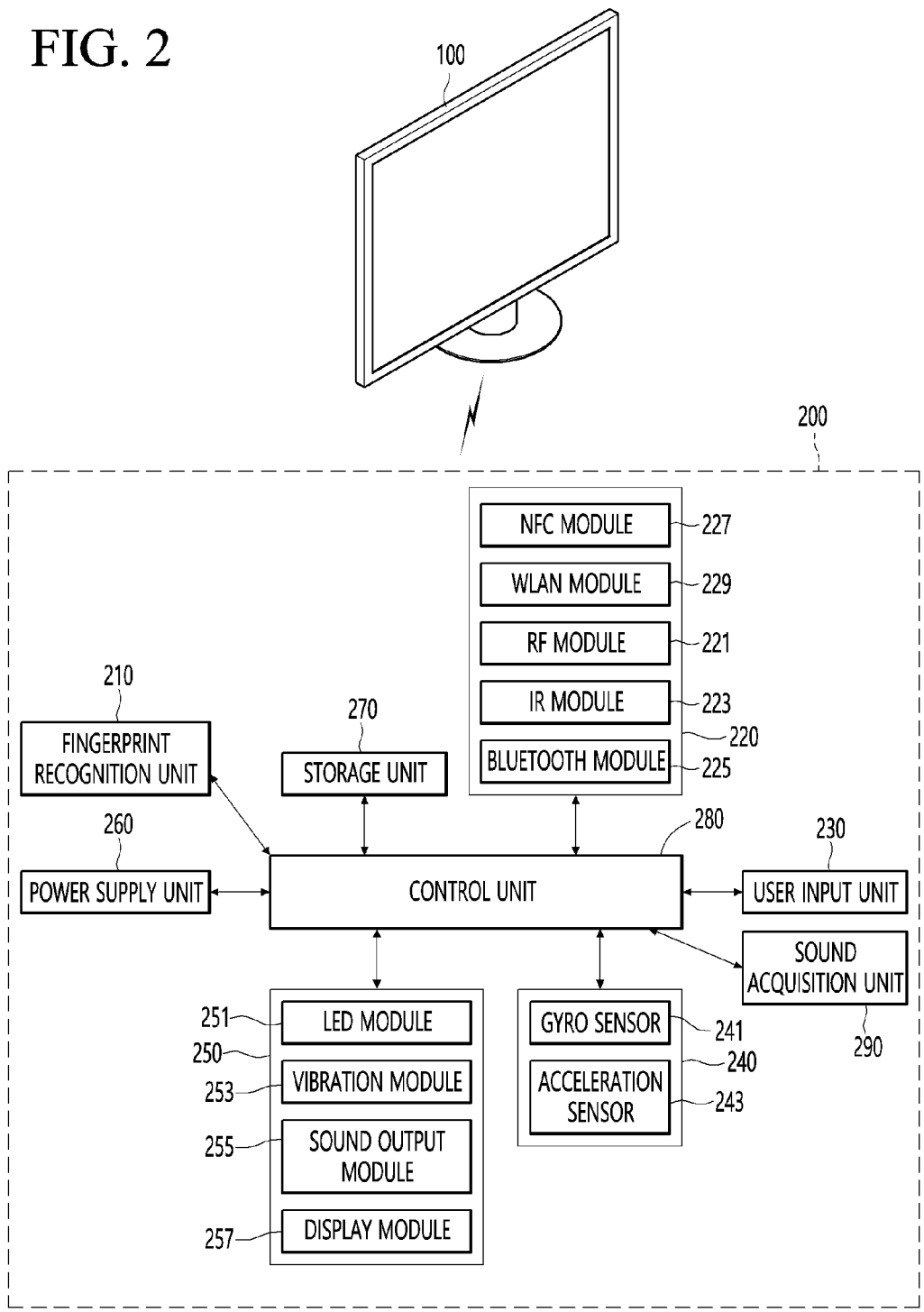
FIG. 2 is a block diagram illustrating a remote control device according to an embodiment of the present disclosure.
Figure 3:
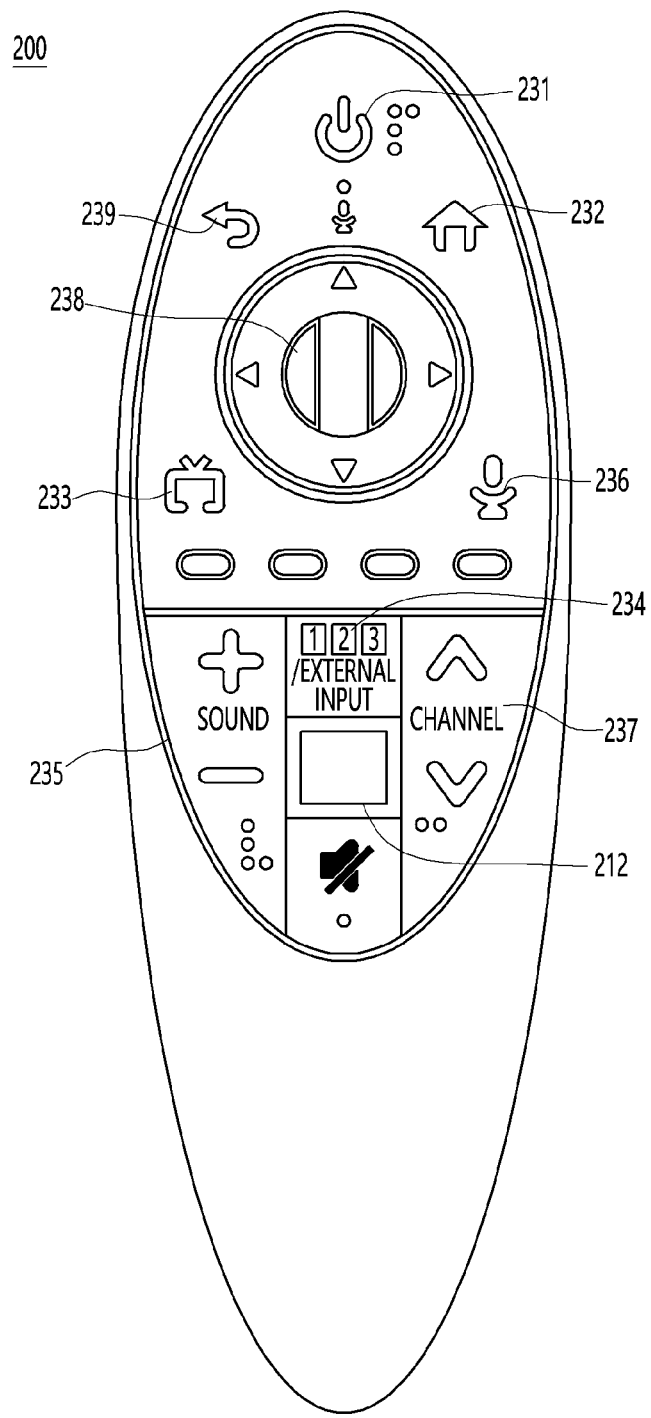
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

Again, referring to FIG. 2, if the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals in response to manipulation of the user input unit 230 or image or voice signals corresponding to signals transmitted from the display device 100. A user can recognize whether the user input unit 230 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 230 or a signal corresponding to movement of the remote control device 200 sensed by the sensor unit 240 to the display device 100 through the wireless communication unit 220.

Additionally, the sound acquisition unit 290 of the remote control device 200 can obtain voice. The sound acquisition unit 290 can include at least one microphone and obtain voice through the microphone 291.

Figure 4:
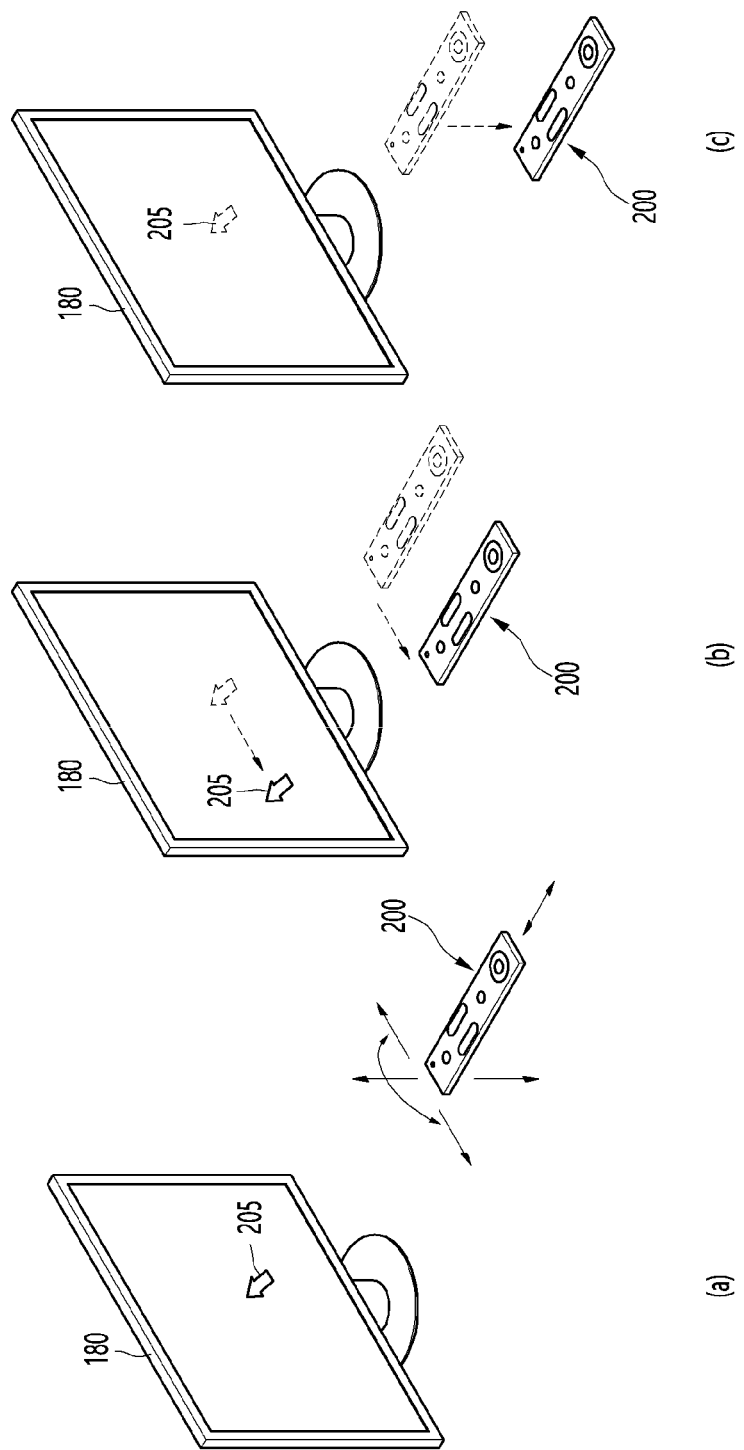
FIG. 4 is a view of utilizing a remote control device according to an embodiment of the present disclosure.

FIG. 4 is a view of utilizing a remote control device according to an embodiment of the present disclosure. FIG. 4(*a*) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the other hand, if a user moves the remote control device 200 close to the display unit 180, a selection area in the display unit 180 corresponding to the pointer 205 can be zoomed out and displayed in a reduced size.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. That is, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

A method of operating a display device according to an embodiment of the present disclosure will be described below with reference to FIG. 5.

Figure 5:
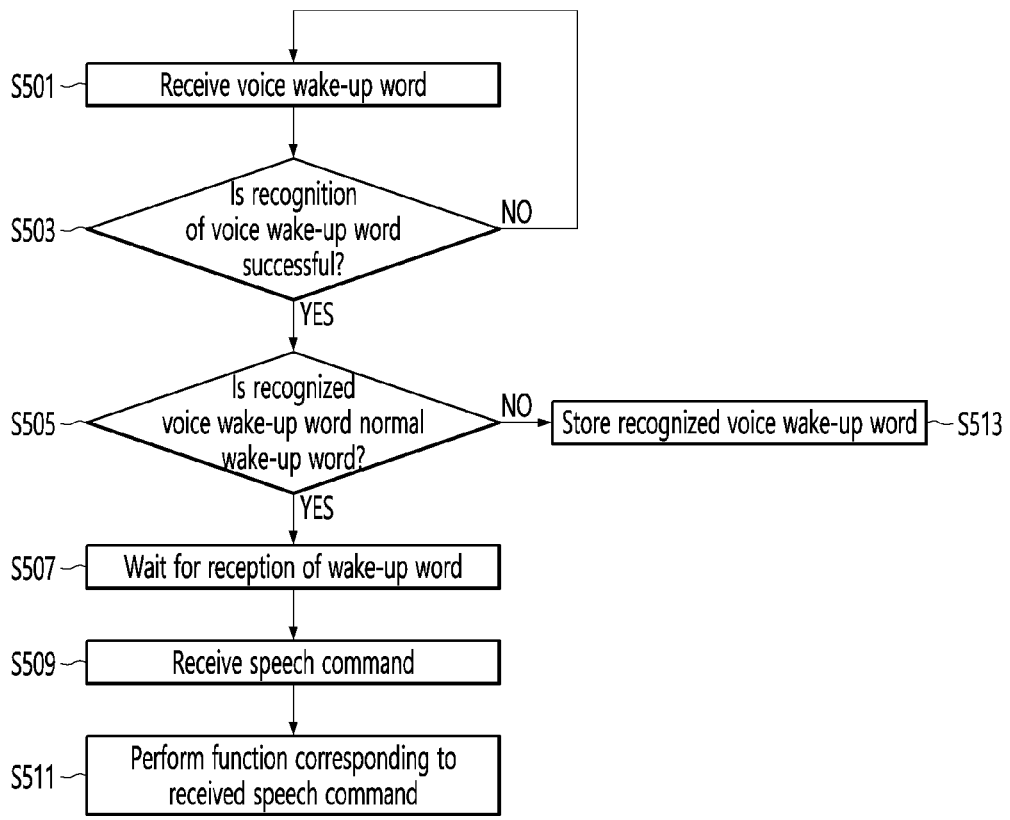
FIG. 5 is a flowchart for describing a method of operating a display device according to an embodiment of the present disclosure.

FIG. 5 is a flowchart for describing a method of operating a display device according to an embodiment of the present disclosure.

Referring to FIG. 5, the control unit 170 of the display device 100 receives a voice wake-up word uttered by a user (S501).

In an embodiment, the control unit 170 may receive the voice wake-up word through a microphone provided in the display device 100.

In another embodiment, the control unit 170 may receive a voice wake-up word uttered by a user from an external device through the wireless communication unit 173.

Here, the external device may be any one of a cradle such as a USB memory or the remote control device 200 shown in FIG. 2.

The external device may receive the user's voice wake-up word and transmit the received voice wake-up word to the display device 100 through a short-range wireless communication standard.

The control unit 170 determines whether the recognition of the received voice wake-up word is successful (S503).

The control unit 170 may perform pre-processing on speech data corresponding to the received voice wake-up word. The pre-processing may include removing noise from a speech signal.

In an embodiment, the control unit 170 may convert the voice wake-up word into a text using an STT engine, and determine whether the converted text matches a text corresponding to a pre-stored wake-up word.

In an embodiment, when the voice wake-up word is successfully recognized, the control unit 170 may output a high signal through a general purpose input output (GPIO) port.

The display device 100 may include a separate hardware element for recognizing a voice wake-up word. The separate hardware for recognizing the voice wake-up word may be included in the control unit 170 or may be implemented as a separate component from the control unit 170. Details will be described later.

Meanwhile, the recognition of the voice wake-up word may be performed in an external device. When the voice wake-up word is recognized by the external device, the control unit 170 may receive speech data corresponding to the recognized voice wake-up word from the external device.

Details will be described with reference to the drawings.

Figure 6:
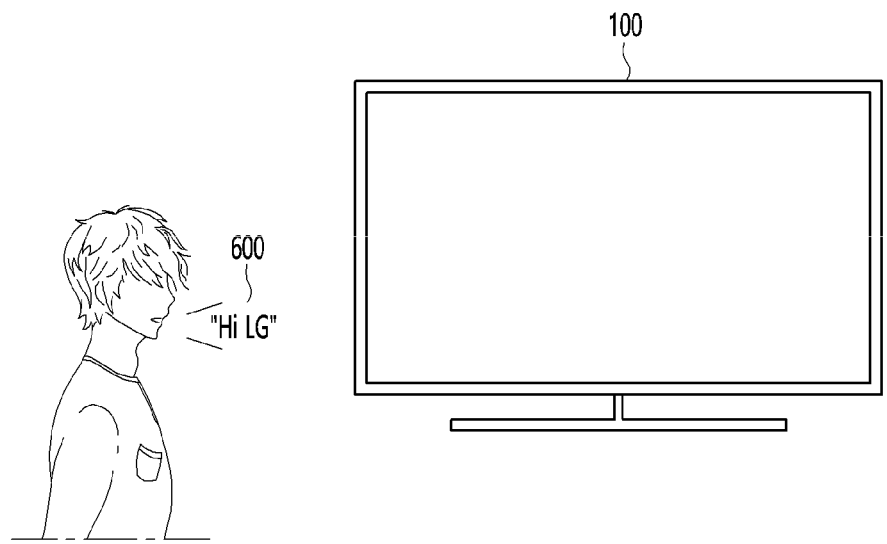
FIGS. 6 and 7 are diagrams for describing an example in which a display device directly receives and recognizes a voice wake-up word according to an embodiment of the present disclosure.
Figure 7:
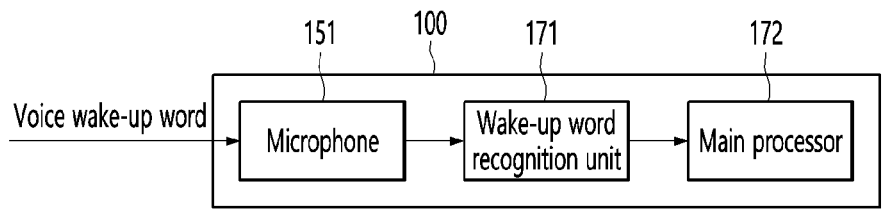

FIGS. 6 and 7 are diagrams for describing an example in which a display device directly receives and recognizes a voice wake-up word according to an embodiment of the present disclosure.

Figure 8:
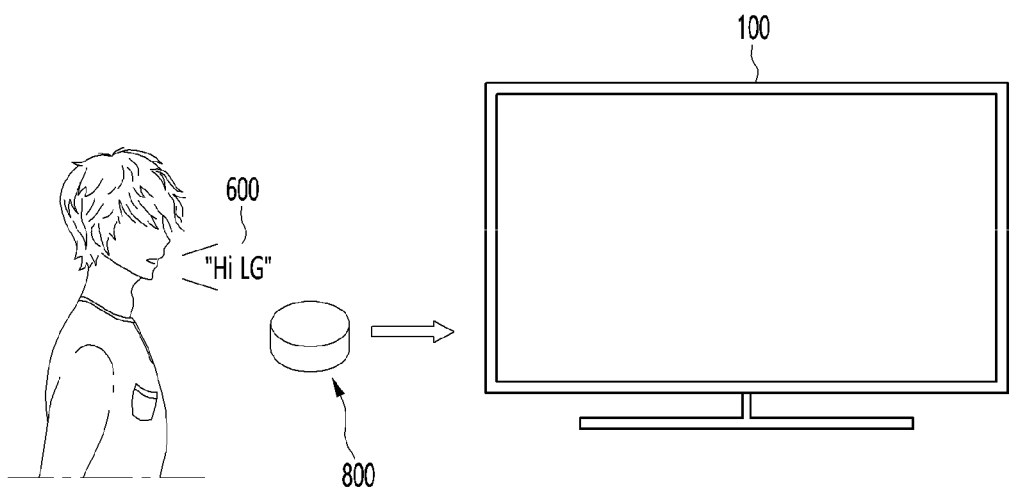
FIGS. 8 and 9 are diagrams for describing an example in which an external device receives and recognizes a voice wake-up word and transmits speech data corresponding to the recognized voice wake-up word to a display device according to another embodiment of the present disclosure.
Figure 9:
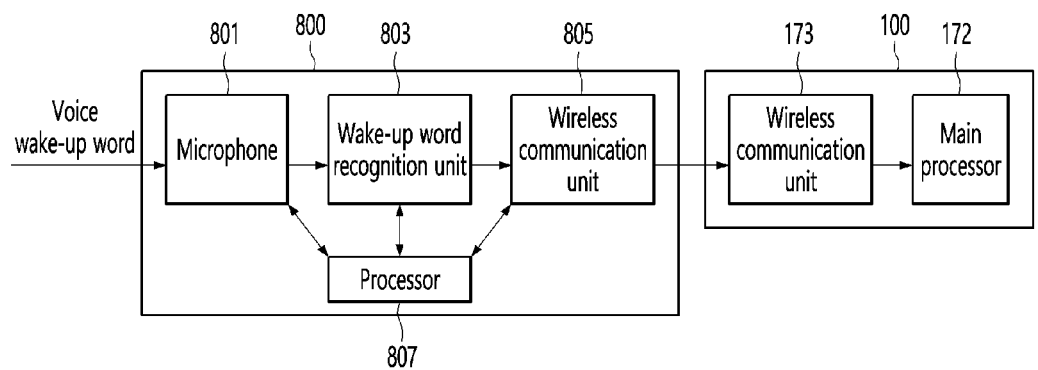

FIGS. 8 and 9 are diagrams for describing an example in which an external device receives and recognizes a voice wake-up word and transmits speech data corresponding to the recognized voice wake-up word to a display device according to another embodiment of the present disclosure.

First, description will be given with reference to FIGS. 6 and 7.

Referring to FIGS. 6 and 7, the microphone 151 of the display device 100 may receive a voice wake-up word 600 uttered by a user. The voice wake-up word 600 may be a command for activating a speech recognition mode of the display device 100.

Hereinafter, it is assumed that the voice wake-up word 600 is <Hi, LG>.

A wake-up word recognition unit 171 of the display device 100 may receive speech data corresponding to the voice wake-up word through the microphone 151.

The wake-up word recognition unit 171 may remove noise from the speech data and convert the speech data from which the noise has been removed into text data using an STT engine. The wake-up word recognition unit 171 may determine whether the converted text data matches text data corresponding to a previously-stored wake-up word.

When the converted text data matches the text data corresponding to the previously-stored wake-up word, the wake-up word recognition unit 171 may determine that the recognition of the voice wake-up word has been successful.

When the converted text data does not match the text data corresponding to the previously-stored wake-up word, the wake-up word recognition unit 171 may determine that the recognition of the voice wake-up word has failed.

When the recognition of the voice wake-up word is successful, the wake-up word recognition unit 171 may transmit the speech data of the recognized voice wake-up word to the main processor 172.

The wake-up word recognition unit 171 may output a high signal through a GPIO port when the voice wake-up word is successfully recognized.

The main processor 172 may identify that the recognition of the voice wake-up word is successful through a high signal outputted. That is, the GPIO high signal may be a signal indicating that the recognition of the voice wake-up word is successful.

Meanwhile, the wake-up word recognition unit 171 and the main processor 172 may be included in the control unit 170. As another example, only the main processor 172 may be included in the control unit 170, and the wake-up word recognition unit 171 may exist as a separate hardware component (chip).

Description will be given with reference to FIGS. 8 and 9.

Referring to FIGS. 8 and 9, a cradle 600 may receive the voice wake-up word 600 uttered by a user.

The cradle 800 may include a microphone 801, a wake-up word recognition unit 803, a wireless communication unit 805, and a processor 807.

The microphone 801 of the cradle 800 may receive a user's voice wake-up word and transmit the received speech data of the voice wake-up word to the wake-up word recognition unit 803.

The wake-up word recognition unit 803 may convert the speech data of the voice wake-up word into text data, and determine whether the converted text data matches prestored text data.

When the converted text data matches the previously-stored text data, the wake-up word recognition unit 171 may determine that the recognition of the voice wake-up word has been successful.

The wake-up word recognition unit 803 may transmit the speech data of the voice wake-up word that has been recognized successfully to the wireless communication unit 805.

The wireless communication unit 805 may transmit the speech data of the voice wake-up word that has been recognized successfully to the wireless communication unit 173 of the display device 100.

The wireless communication unit 805 may transmit the speech data to the display device 100 through a short-range wireless communication standard. To this end, the wireless communication unit 805 may include a Bluetooth module, a Wi-Fi module, or the like.

Meanwhile, the cradle 800 may transmit, to the display device 100, wake-up word recognition information indicating that the recognition of the voice wake-up word is successful, in addition to the speech data of the voice wake-up word that has been recognized successfully.

The processor 807 of the cradle 800 may generally control components of the cradle 800.

The processor 807 of the cradle 800 may transmit, to the display device 100, the speech data corresponding to the user's speech command additionally received after successful recognition of the voice wake-up word.

According to the embodiment of FIGS. 8 and 9, even when a microphone is not provided in the display device 100, a voice wake-up word and a speech command can be received through an external device, thus reducing the production cost of the display device 100 and burdens on the chip design.

Description will be given referring again to FIG. 5.

When the recognition of the received voice wake-up word is successful, the control unit 170 determines whether the recognized voice wake-up word is a normal wake-up word (S505).

In an embodiment, the control unit 170 may verify whether the recognized voice wake-up word is a normal wake-up word.

The control unit 170 may determine whether the voice wake-up word is a normal wake-up word based on speech features of the recognized voice wake-up word.

Hereinafter, a process of determining whether the voice wake-up word is a normal wake-up word will be described in detail.

Figure 10:
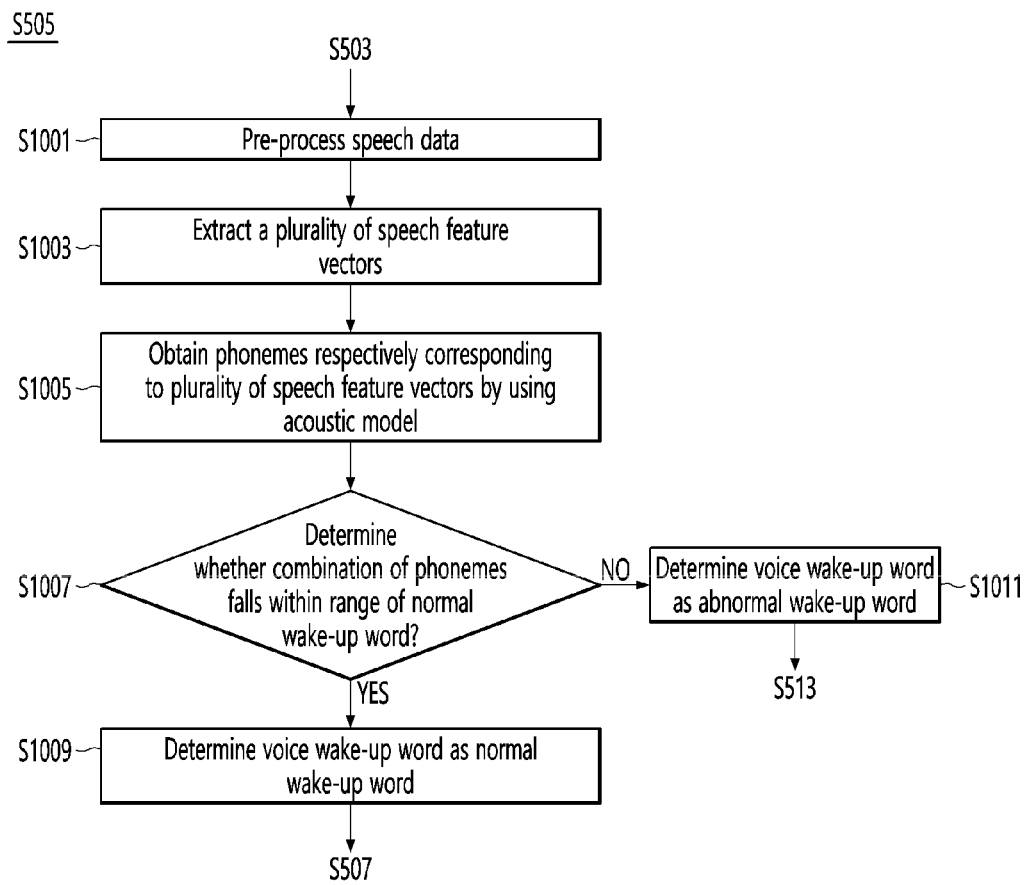
FIG. 10 is a diagram for describing a process of verifying whether a recognized voice wake-up word is a normal wake-up word according to an embodiment of the present disclosure.

FIG. 10 is a diagram for describing a process of verifying whether a recognized voice wake-up word is a normal wake-up word according to an embodiment of the present disclosure.

In particular, FIG. 10 is a diagram specifically describing step S503.

The control unit 170 pre-processes speech data corresponding to a recognized voice wake-up word (S1001).

In an embodiment, the control unit 170 may perform pre-processing such as decoding, normalization processing, and noise removal on the speech data.

The pre-processing may also include a process of converting a speech signal on a time axis into a power spectrum on a frequency axis.

The control unit 170 extracts a plurality of speech feature vectors from the preprocessed speech data (S1003).

In an embodiment, the control unit 170 may divide the preprocessed speech data into a plurality of time units and extract a speech feature vector corresponding to each time unit.

The speech feature vector may be a vector representing speech features in a corresponding time unit.

The speech feature vector may have a dimension corresponding to the number of speech features.

The control unit 170 obtains phonemes respectively corresponding to the plurality of speech feature vectors by using an acoustic model (S1005).

The acoustic model may be a model in which phonemes corresponding to values of the speech feature vectors are stored in correspondence with each other.

The control unit 170 may search for the phonemes corresponding to the values of the plurality of speech feature vectors using the acoustic model.

The control unit 170 may obtain a plurality of phonemes respectively corresponding to the plurality of speech feature vectors according to the search result.

The control unit 170 determines whether a combination of obtained phonemes falls within a range to be recognized as a normal wake-up word (S1007).

The control unit 170 may determine whether the combination of phonemes falls within a recognition range of the normal wake-up word.

When the combination of obtained phonemes falls within the range to be recognized as a normal wake-up word, the control unit 170 determines the voice wake-up word as a normal wake-up word (S1009).

When the combination of obtained phonemes does not fall within the range to be recognized as a normal wake-up word, the control unit 170 determines the voice wake-up word as an abnormal wake-up word (S1011).

Steps S1005 to S1011 will be described in detail with reference to FIG. 11.

Figure 11:
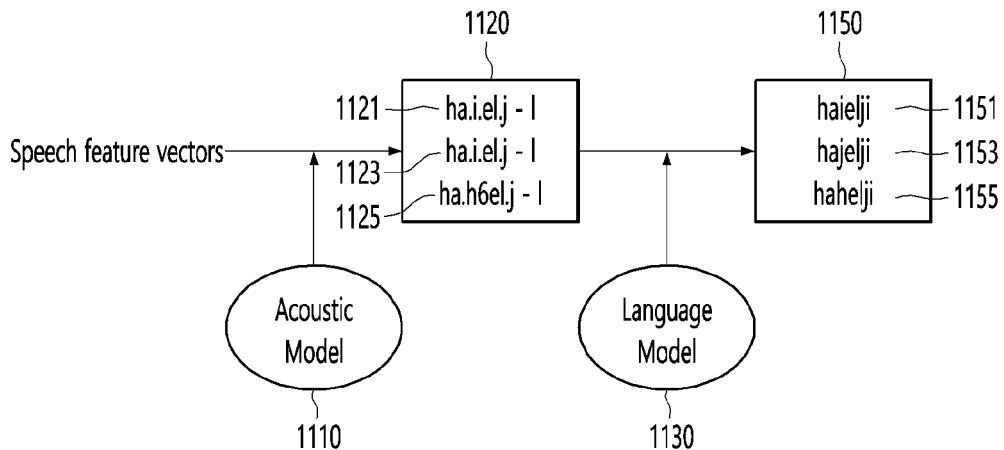
FIG. 11 is a diagram for describing a process of determining whether or not a voice wake-up word falls within a range of a normal wake-up word based on an acoustic model and a language model.

FIG. 11 is a diagram for describing a process of determining whether or not a voice wake-up word falls within a range of a normal wake-up word based on an acoustic model and a language model.

First, the control unit 170 may extract speech feature vectors from a speech signal corresponding to a voice wake-up word.

The control unit 170 may convert the speech signal of the voice wake-up word into a power spectrum through Fast Fourier Transform (FFT) transformation.

The control unit 170 may extract a speech feature vector from the power spectrum at unit time intervals.

The speech feature vector may be a vector representing speech features corresponding to unit time intervals. The speech features may include one or more of a frequency band and a magnitude of an amplitude in the frequency band.

The control unit 170 may convert speech feature vectors into a combination of phonemes using the acoustic model 1110.

The acoustic model 1110 may store a correspondence relationship in which phonemes corresponding to the values of the speech feature vectors matches the speech feature vectors.

The control unit 170 may search the acoustic model 1110 to obtain a phoneme matching the speech feature vector.

Referring to FIG. 11, three phoneme combinations 1121 to 1125 included in a phoneme group 1120 are illustrated.

A first phoneme combination 1121 is <ha.i.el.j-i>, a second phoneme combination 1123 is <ha.jel.j-i>, and a third phoneme combination 1125 is <ha.h6el-i>.

The control unit 170 may obtain a Hangul text matching each phoneme combination using the language model 1130.

The language model 1130 may be a model for converting letters of a first language constituting a phoneme combination into letters of a second language.

The control unit 170 may convert the phoneme group 1120 into a language text group 1150 using the language model 1130.

Specifically, the control unit 170 may convert the first phoneme combination 1121 into a first language text 1151 (Haielji) using the language model 1130.

Likewise, the control unit 170 may convert the second phoneme combination 1123 into a second language text 1153 (Haielji) and the third phoneme combination 1125 into a third language text 1155, respectively.

Each of the acoustic model 1110 and the language model 1130 may have different languages depending on countries in which the display device 100 is used.

The control unit 170 may determine whether each converted language text falls within a range of a normal wake-up word.

The control unit 170 may determine whether the language text falls within the range of the normal wake-up word through comparison between registered normal wake-up words previously stored and the converted language text.

When the converted language text is included in the registered normal wake-up words previously stored, the control unit 170 may determine that the corresponding language text falls within the range of the normal wake-up words.

For example, when a first language text 1151 and a second language text 1153 correspond to the previously registered normal wake-up words, the control unit 170 may determine the voice wake-up word that is the basis of the first language text 1151 and the second language text 1153 as normal wake-up words. That is, in this case, the control unit 170 may determine that the verification of the voice wake-up word is successful.

When the third language text 1155 does not correspond to a previously registered normal wake-up word, the control unit 170 may determine the third language text 1155 as an abnormal wake-up word.

Description will be given referring again to FIG. 5.

When it is determined that the recognized voice wake-up word is a normal wake-up word, the control unit 170 waits for reception of a speech command (S507).

The main processor 172 may output a low signal through a GPIO port when the voice wake-up word is verified as a normal wake-up word. The output low signal may be transmitted to the wake-up word recognition unit 171.

Thereafter, the control unit 170 receives a speech command (S509) and performs a function of the display device 100 corresponding to the received speech command (S511).

After successful verification of the voice wake-up word, the received speech command may be a command for performing a specific function.

For example, the speech command may be a command indicating execution of a specific application installed in the display device 100 or may be, for example, a channel change command or a volume control command.

The control unit 170 may convert the received speech command into a text, determine a user's intention using the converted text, and perform a function corresponding to the speech command according to the determined user's intention.

In order to determine the user's intention, a known natural language processing technique may be used.

In step S509, when a microphone is provided in the display device 100, the speech command may receive a speech command through the microphone.

When the display device 100 does not include a microphone, the display device 100 may receive a speech command from the cradle 800.

The cradle 800 may receive a speech command through the microphone 801 and transmit the received speech command to the display device 100 through a wireless communication unit 805.

On the other hand, when it is determined that the recognized voice wake-up word is not a normal wake-up word (S505), the control unit 170 stores the recognized voice wake-up word in the storage unit 140 (S513).

In an embodiment, in a case where the recognized voice wake-up word is not a normal wake-up word, when the same voice wake-up word is received later, the control unit 170 may store the corresponding voice wake-up word to prevent misrecognition. Accordingly, the control unit 170 may not activate a speech recognition mode when an abnormal wake-up word is received again.

In addition, the control unit 170 outputs a notification informing that the recognized voice wake-up word is an abnormal wake-up word (S515).

For example, the control unit 170 may display the notification indicating that the recognized voice wake-up word is an abnormal wake-up word through the display unit 180.

As another example, the control unit 170 may output a notification indicating that the recognized voice wake-up word is an abnormal wake-up word through the audio output unit 185.

Figure 12:
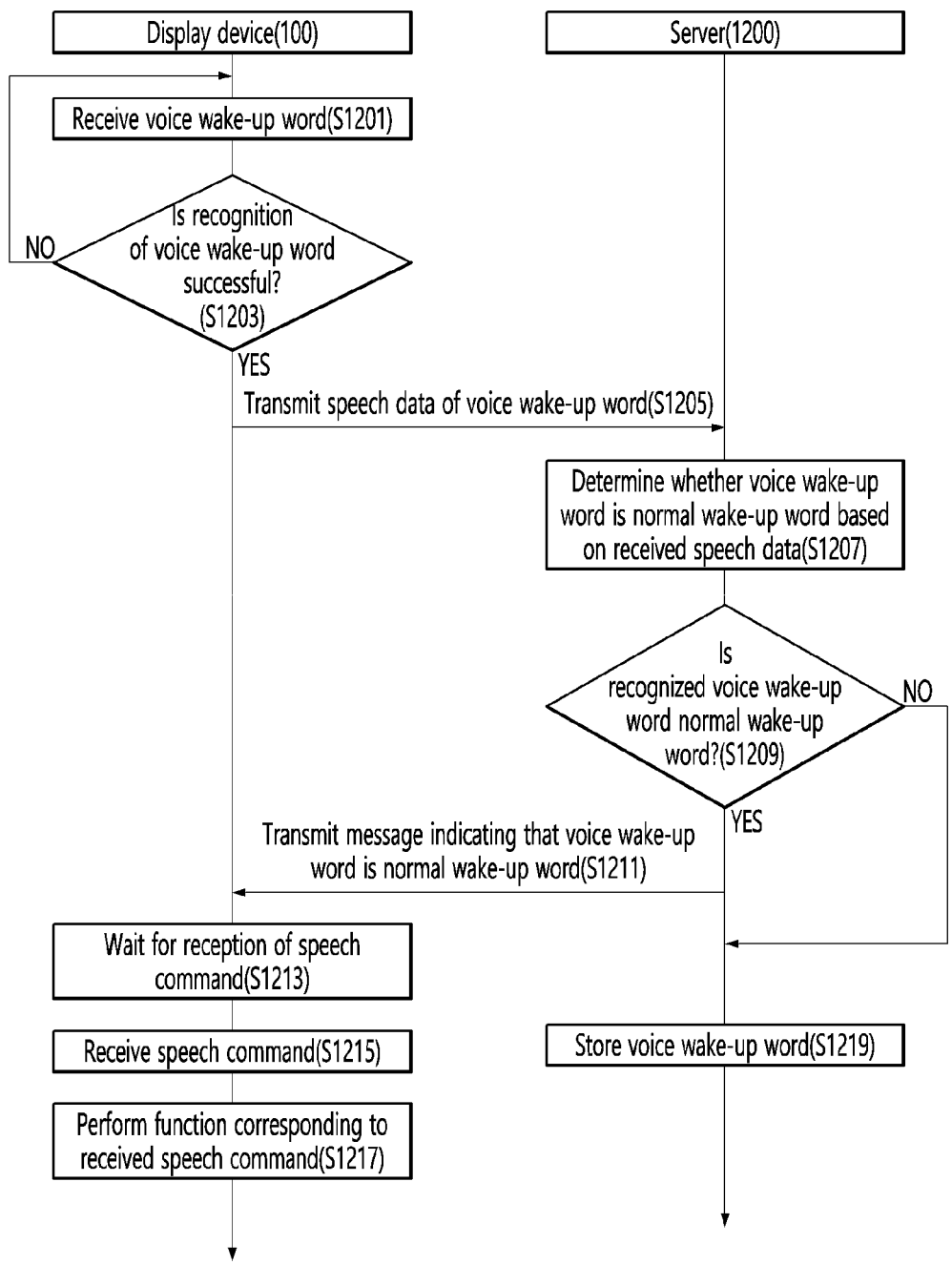
FIG. 12 is a ladder diagram for describing a method of operating a speech recognition system according to an embodiment of the present disclosure.

FIG. 12 is a ladder diagram for describing a method of operating a speech recognition system according to an embodiment of the present disclosure.

In particular, FIG. 12 is a diagram for describing an example in which the display device 100 recognizes a voice wake-up word and a server 1100 verifies whether a voice wake-up word is a normal wake-up word.

The control unit 170 of the display device 100 receives a voice wake-up word uttered by a user (S1201).

The detailed description of step S1201 is replaced with the description of step S501 of FIG. 5.

The control unit 170 of the display device 100 determines whether the recognition of the received voice wake-up word is successful (S1203).

The detailed description of step S1203 is replaced with the description of step S503 of FIG. 5.

When the recognition of the voice wake-up word is successful, the control unit 170 of the display device 100 transmits the speech data of the voice wake-up word to the server 1200 through the network interface unit 133 (S1205).

The control unit 170 may transmit the speech data of the voice wake-up word to the server 1200 to verify whether the voice wake-up word is misrecognized.

The server 1200 determines whether the voice wake-up word is a normal wake-up word based on the speech data of the voice wake-up word received from the display device 100 (S1207).

The server 1200 may determine whether the voice wake-up word is a normal wake-up word using the embodiment of FIG. 10.

When the server 1200 determines that the voice wake-up word is a normal wake-up word (S1209), the server 1200 transmits a message indicating that the voice wake-up word is a normal wake-up word to the display device 100 (S1211).

The display device 100 may determine that the voice wake-up word received in step S1201 is a normal wake-up word according to the message received from the server 1200. That is, the display device 100 may determine that the verification of the voice wake-up word has been successful.

The control unit 170 of the display device 100 activates the speech recognition mode according to the message received from the server 1200 and waits for reception of a speech command (S1213).

That is, the control unit 170 of the display device 100 identifies whether the voice wake-up word uttered by the user is a normal wake-up word according to the message received from the server 1200, and activates the speech recognition mode capable of performing a function for the user's speech command.

The control unit 170 of the display device 100 receives a speech command uttered by a user (S1215) and performs a function of the display device 100 corresponding to the received speech command (S1217).

On the other hand, when it is determined that the voice wake-up word is not a normal wake-up word (S1209), the server 1200 stores the corresponding voice wake-up word (S1219).

The server 1200 may store the voice wake-up word determined as an abnormal wake-up word in a database.

The reason for this is to quickly verify whether the voice wake-up word is as abnormal wake-up word using the database when the same voice wake-up word is received later.

According to an embodiment of the present disclosure, the above-described method may be implemented as processor readable codes on a medium in which a program is recorded. Examples of the medium readable by the processor include a ROM (Read Only Memory), a Random Access Memory (RAM), a CD-ROM, a magnetic tape, a floppy disk, an optical data storage device, and the like, and may be implemented in the form of a carrier wave (for example, transmission through the Internet).

The display device described above is not limitedly applicable to the configuration and method of the above-described embodiments, and the embodiments are configured by selectively combining all or part of each of the embodiments such that various modifications can be made.

The invention claimed is:

1. A display device comprising:
    a wireless communication unit configured to communicate with an external device that receives a voice wake-up word;
    a main processor configured to:
    receive, from the external device, wake-up word recognition information indicating that a recognition of the voice wake-up word is successful and a speech data of the voice wake-up word through the wireless communication unit,
    extract speech feature vectors representing feature information of the voice wake-up word,
    convert the speech feature vectors into a combination of phonemes by using a first model,
    convert the combination of phonemes into a language text by using a second model,
    determine whether the converted language text falls within a recognition range of the normal wake-up word through comparison between registered normal wake-up words previously stored and the converted language text, and
    when the converted language text falls within the recognition range of the normal wake-up word, determine the voice wake-up word as the normal wake-up word,
    when it is determined that the voice wake-up word is the normal wake-up word, perform a function corresponding to a speech command received from the external device after receiving the speech data of the voice wake-up word,
    wherein a number of phoneme combinations and a number of converted language texts are the same,
    wherein the converted language texts are divided into the normal wake-up word and an abnormal wake-up word based on the determination whether the converted language text falls within a recognition range of the normal wake-up word,
    wherein the abnormal wake-up word is stored in a storage unit to prevent misrecognition, and
    wherein the main processor is further configured to inactivate a speech recognition mode of the display device when the abnormal wake-up word is received again, and output a notification informing the reception of the abnormal wake-up word.

2. The display device of claim 1, wherein the main processor is configured to activate the speech recognition mode of the display device when the voice wake-up word is determined as the normal wake-up word.

3. The display device of claim 1, wherein the main processor is configured to convert the speech command into text data, obtain user intention information from the converted text data, and perform the function corresponding to the obtained intention information.

4. The display device of claim 1, wherein the second model receives a plurality of language texts and determines a first language text of the plurality of language texts is a normal wake-up word and a second language text of the plurality of language texts is an abnormal wake-up word.

5. An operating method of a display device, the method comprising:
    receiving, from an external device that receives a voice wake-up word, a wake-up word recognition information indicating that a recognition of the voice wake-up word is successful and a speech data of the voice wake-up word;
    extracting speech feature vectors representing feature information of the voice wake-up word;
    converting the speech feature vectors into a combination of phonemes by using a first model;
    converting the combination of phonemes into a language text by using a second model;
    determining whether the converted language text falls within a recognition range of the normal wake-up word through comparison between registered normal wake-up words previously stored and the converted language text; and
    when the converted language text falls within the recognition range of the normal wake-up word, determining the voice wake-up word as the normal wake-up word,
    when it is determined that the voice wake-up word is the normal wake-up word, performing a function corresponding to a speech command received from the external device after receiving the speech data of the voice wake-up word,
    wherein a number of phoneme combinations and a number of converted language texts are the same, wherein the converted language texts are divided into the normal wake-up word and an abnormal wake-up word based on the determination whether the converted language text falls within a recognition range of the normal wake-up word,
wherein the abnormal wake-up word is stored in a storage unit to prevent misrecognition, and
when the abnormal wake-up word is received again, a speech recognition mode of the display device is inactivated, and a notification informing the reception of the abnormal wake-up word is outputted.

6. The method of claim 5, further comprising activating the speech recognition mode of the display device when the voice wake-up word is determined as the normal wake-up word.

7. The method of claim 5, wherein the performing step comprises:
converting the speech command into text data;
obtaining user intention information from the converted text data; and
performing the function corresponding to the obtained intention information.

8. The display device of claim 4, wherein the main processor is further configured to output a notification that the second language text is an abnormal wake-up word.

* * * * *